United States Patent
Robinson

[15] 3,670,462
[45] June 20, 1972

[54] LAPPING OF BALL BEARING RACEWAY

[72] Inventor: John F. Robinson, Newport Beach, Calif.

[73] Assignee: North American Rockwell Corporation, El Segundo, Calif.

[22] Filed: Sept. 2, 1970

[21] Appl. No.: 69,096

Related U.S. Application Data

[62] Division of Ser. No. 746,575, July 22, 1968, abandoned.

[52] U.S. Cl.................................................51/291, 51/26
[51] Int. Cl.............................................................B24b 1/00
[58] Field of Search..............................51/291, 289 S, 26, 27

[56] References Cited
UNITED STATES PATENTS

| 1,708,491 | 4/1929 | Alden | 51/291 |
| 2,290,541 | 7/1942 | Cramer | 51/291 X |

FOREIGN PATENTS OR APPLICATIONS

| 440,777 | 1/1936 | Great Britain | 51/26 |

*Primary Examiner*—Lester M. Swingle
*Attorney*—L. Lee Humphries

[57] ABSTRACT

A method and apparatus for randomly lapping a ball bearing race and removing the deviations from a smooth cross race curvature wherein the bearing race is rotated about its nominal center, a conforming ball in a slurry of fine abrasives is rotated in a highly random manner in the race thus transferring the uniform radius and finish of the ball to the bearing race surface.

4 Claims, 3 Drawing Figures

LAPPING OF BALL BEARING RACEWAY

CROSS REFERENCE TO RELATED APPLICATION

This application is a division of my copending application Ser. No. 746,575, filed July 22, 1968, now abandoned.

BACKGROUND OF THE INVENTION

1. Field of the Invention

The present invention relates to a method for finishing bearing raceways, and more particularly, to a method for randomly lapping a ball bearing raceway surface with a conforming lapping ball.

2. Description of the Prior Art

In precision ball bearings where low running friction and long life are required, the surface condition of the raceway is of prime importance.

The present methods of finishing raceways are to control the cross-race curvature as closely as possible with either a form cut or a form grind, then polish the surface to a very fine finish. The shape of the cutting tool or grinding wheel is initially designed to conform to the nominal radius of the desired raceway. Cutting tools and grinding wheels, however, leave much to be desired. Since no tools or polishing wheels will maintain uniform geometry while cutting or polishing, the cross-section of the bearing race will display irregularities. At a microscopic level the bearing surface will display both waviness and circular scratch marks. The waviness is due to changes from a true radius as the form cutter or grinder breaks down. The scratch marks are due to the polishing operation. The polishing tends to follow the geometry established by the forming operation.

Another technique resorted to, which is capable of furnishing somewhat better results, involves running a full complement of balls in a slurry of fine abrasives in a ball bearing system. The balls, however, tend to go into planetary motion, that is, they tend to rotate about a given fixed axis. This results in the race irregularities actually cutting into the balls such that the contour generated averages between the ball and the race contour leaving the raceway surface with a substantial number of remaining irregularities.

In a normal ball bearing, operating at rotational speeds sufficient to generate a hydrodynamic film, the onset of wear depends upon the thickness of the hydrodynamic film in relation to the number and height of the surface irregularities. Where the asperities exceed the hydrodynamic film thickness, wear takes place. Conventional ball bearings start to wear initially by breaking down the peaks of the largest asperities. As these high points are broken down, wear debris begins to accumulate in the lubricant contributing to further wear.

The next stage of wear takes the form of surface fatigue where the peaks of some of the larger asperities have been removed. With repeated cycling, these highly stressed localized fatigue conditions force small particles to break off, according to classical fatigue theory. This process is degenerative since more asperities are exposed, generating more debris until lubrication and/or bearing failure takes place.

SUMMARY OF THE INVENTION

According to the present invention, these and other problems of the prior art are eliminated by substantially reducing the number and magnitude of raceway surface irregularities. This is achieved by utilizing a lapping ball conforming to the raceway curvature. The bearing race is rotated about its nominal center. The conforming ball is rotated in a highly random manner, sometimes across the raceway, sometimes in and sometimes contra to the direction of rotation, sometime at various angles to all of these directions. The addition of a slurry of fine abrasives provides all necessary cutting action.

The advantages of such a procedure are many. The uniform radius and finish of the lapping ball is transferred to the bearing raceway. The irregularities in the raceway surface are substantially eliminated thus retarding the onset of wear and greatly increasing bearing life.

It is, therefore, an object of the present invention to provide a novel for finishing ball bearing raceway surfaces.

It is a further object of the present invention to provide a novel method for eliminating irregularities in the surface of a ball bearing raceway.

It is a still further object of the present invention to provide a method for randomly lapping ball bearing raceway surfaces to a very fine finish.

It is another object of the present invention to improve the basic geometry and finish of ball bearing raceways so as to increase bearing life.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures.

DESCRIPTION OF THE PREFERRED EMBODIMENT

Figure 1:
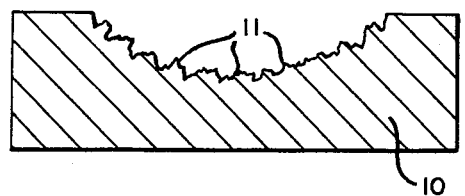
FIG. 1 is a cross-section of a bearing race illustrating the microscopic irregularities left in the race surface by standard finishing techniques.

Referring now to the drawings and, more particularly, to FIG. 1 thereof, there is shown a cross-sectional view of a bearing race (10) finished in accordance with prior art techniques wherein surface irregularities (11) are shown in exaggerated perspective for clarity. The cross-section illustrates both waviness, which represents deviations from a true radius caused by the form cutter or grinder breading down, and finer scratch deviations, generally following the geometry established by the forming operation, caused by the polishing techniques. The high points of these irregularities will establish contact first with the bearing ball. The ball will, therefore, tend to distribute its entire load on these contact points.

Figure 2:
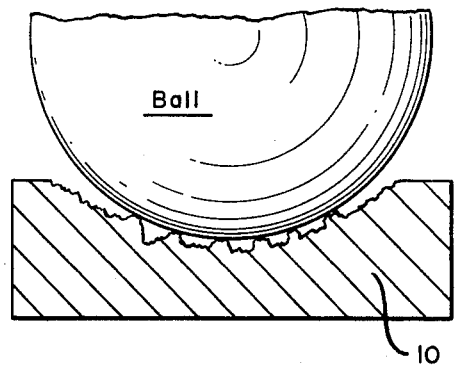
FIG. 2 is a cross-section of a bearing race and ball illustrating the condition of the raceway after a ball has worn down the peaks of acme of the larger irregularities.

Conventional ball bearings start to wear initially by breaking down the high points of these sharp irregularities as illustrated in FIG. 2. As the high points are broken down, wear debris begins to accumulate in the lubricant contributing to further wear, as previously discussed. The next stage of wear takes the form of surface fatigue where the asperities have been removed. With repeated cycling, these high stress, localized fatigue conditions cause small particles to break off, according to classical fatigue theory. This process is degenerative since more asperities are exposed, generating more debris until lubrication and/or bearing failure takes place.

Figure 3:
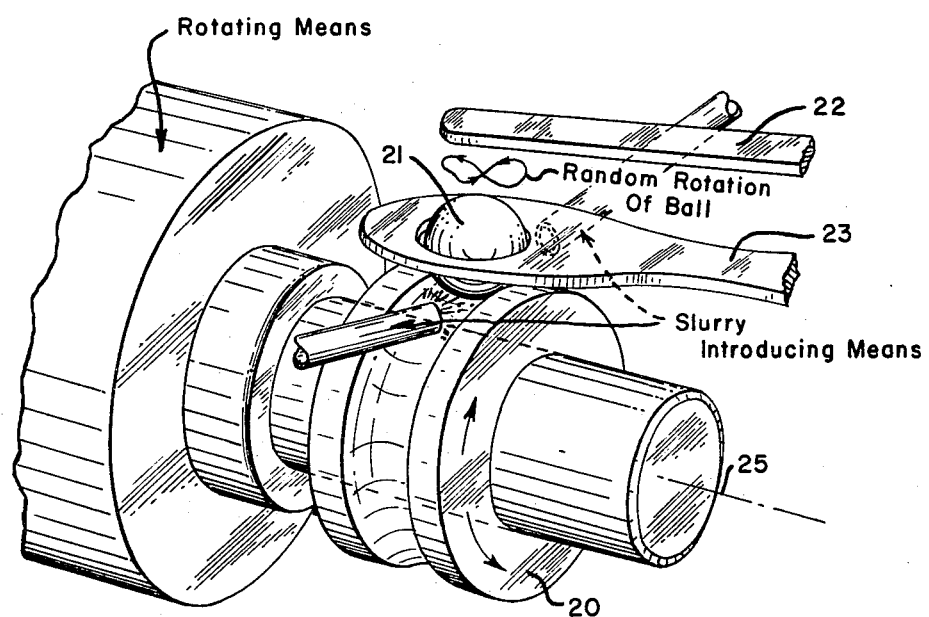
FIG. 3 is a diagram of the method for finishing raceway surfaces in accordance with the teachings of the present invention.

Referring now to FIG. 3, according to the present invention, these problems are significantly reduced by the raceway lapping method disclosed which substantially eliminates the raceway irregularities. Bearing race 20 is rotated about its nominal center 25. A conforming lapping ball 21 whose radius of curvature conforms to the radius of the race, is slowly rotated in a highly random manner, sometimes across the race, sometimes in and sometimes contra to the direction of rotation, sometimes at an angle to each of the above-mentioned directions. Complete randomness of rotation is not required so long as the axis of rotation changes in a non-repetitive manner for a substantial time period. It is normally desirable to fabricate the lapping ball from a material softer than the race material so that abrasives will adhere to the softer material rather than the surface being removed. Otherwise, the abrasives may tend to be charged into the race surface, deleteriously affecting the polished surface. Pressure on and random rotation of the ball is affected by paddle 22. Retainer 23 loosely holds the ball and prevents it from falling out of the race. A slurry of abrasives introduced into the area between the ball and the race provides all necessary cutting action. The random rotation of the lapping ball substantially eliminates all raceway irregularities and insures that the uniform radius and finish of the ball is transferred to the bearing race. Although the lapping operation has been illustrated with reference to an inner raceway, it is contemplated that outer raceways will be lapped in the same manner.

The result is a uniform raceway surface which exhibits a substantially more uniform cross-sectional geometry. Raceway surfaces finished in this manner exhibit a reduction in breakaway friction of as much as 50 percent, thus substantially reducing the friction level of the ball bearing and increasing bearing life.

In one lapping operation, a slurry consisting of two parts by weight jeweler's rouge and one part by weight of tricresophosphate was used although the specific slurry composition is not critical. The races, both inner and outer, were held in a jeweler's lath and rotated at approximately 100 rpms. The ball used for lapping was made of 440 C hardened to 40-50 $R_c$ with its diameter substantially in conformance with the race to be lapped. A load of approximately 2 ounces was applied to the ball. The result was a bearing race exhibiting a significantly smoother surface than that obtainable by any other prior art procedure.

The advantages of the present lapping procedure may now be appreciated. A smoother more regular bearing raceway surface is achieved exhibiting a significantly lower breakaway torque resulting in lower running friction and increased bearing life.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. Method for randomly lapping the raceway surface of a bearing race of a ball bearing comprising the steps of rotating a bearing race having a raceway surface about its nominal axis, retaining loosely a lapping ball having a uniform radius of curvature defining a smooth and uniform surface of said ball, such that said ball is retained in close proximity to said raceway surface while said bearing race is rotated, introducing a slurry of abrasives onto said raceway surface, imparting a completely random movement to said ball, applying pressure to said ball whereby the uniform radius of curvature of said ball is imparted to said raceway surface thereby eliminating raceway irregularities.

2. A method for randomly lapping the raceway surface of a bearing race of a ball bearing in accordance with claim 1, wherein the radius of curvature of said ball substantially conforms to the desired radial cross-sectional radius of curvature of said bearing race.

3. A method for randomly lapping the raceway surface of a bearing race of a ball bearing in accordance with claim 2 wherein said ball is of a material softer than the material of said raceway surface, whereby the introduction of said abrasives will result in said abrasives adhering substantially entirely to the surface of said ball.

4. A method for randomly lapping the raceway surface of a bearing race of a ball bearing in accordance with claim 1, wherein the rotation of said bearing race is slow and the introduction of said abrasives is onto said raceway surface between said ball and said surface and said abrasive is finely textured.

* * * * *

UNITED STATES PATENT OFFICE
CERTIFICATE OF CORRECTION

Patent No. 3,670,462           Dated June 20, 1972

Inventor(s) John F. Robinson

It is certified that error appears in the above-identified patent and that said Letters Patent are hereby corrected as shown below:

Column 2, line 2, after "novel" insert ---method--- line 27, delete "acme" and insert ---some of the---

Signed and sealed this 6th day of March 1973.

(SEAL)
Attest:

EDWARD M. FLETCHER, JR.                ROBERT GOTTSCHALK
Attesting Officer                       Commissioner of Patents